(12) United States Patent
Inada

(10) Patent No.: US 11,128,379 B2
(45) Date of Patent: Sep. 21, 2021

(54) MULTI-BAND SIGNAL PROCESSING SYSTEM, JOINT BOX FOR MULTI-BAND SIGNAL PROCESSING SYSTEM, AND METHOD FOR ACCOMMODATING MULTI-BAND SIGNAL PROCESSING SYSTEM

(71) Applicant: NEC Corporation, Tokyo (JP)

(72) Inventor: Koji Inada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 565 days.

(21) Appl. No.: 16/073,406

(22) PCT Filed: Feb. 20, 2017

(86) PCT No.: PCT/JP2017/006069
§ 371 (c)(1),
(2) Date: Jul. 27, 2018

(87) PCT Pub. No.: WO2017/145973
PCT Pub. Date: Aug. 31, 2017

(65) Prior Publication Data
US 2019/0036607 A1    Jan. 31, 2019

(30) Foreign Application Priority Data

Feb. 24, 2016    (JP) .............................. JP2016-033048

(51) Int. Cl.
*H04B 10/294*    (2013.01)
*H04J 14/02*    (2006.01)
(Continued)

(52) U.S. Cl.
CPC ........... *H04B 10/2941* (2013.01); *G02B 6/28* (2013.01); *H01S 3/0677* (2013.01);
(Continued)

(58) Field of Classification Search
CPC ...... G02B 6/28; G02B 6/293; G02B 6/29391; H04J 14/02; H04B 10/294; H04B 10/297;
(Continued)

(56) References Cited

U.S. PATENT DOCUMENTS 5,162,937 A * 11/1992 Heidemann ......... H04J 14/0298
398/140
6,144,474 A * 11/2000 Nitta ................... H04B 10/2972
398/212
(Continued)

FOREIGN PATENT DOCUMENTS

CN    101836378 A    9/2010
CN    103701493 A    4/2014
(Continued)

OTHER PUBLICATIONS

Extended European Search Report for EP Application No. 17756411.9 dated Oct. 16, 2019.
(Continued)

*Primary Examiner* — Abbas H Alagheband
(74) *Attorney, Agent, or Firm* — Sughrue Mion, PLLC

(57) ABSTRACT

[Problem] To accommodate single-band signal processing devices in a high-density manner.
[Solution] Provided is a system including: a first signal cable; a second signal cable; a third signal cable; a fourth signal cable; a first multi-band signal processing device that processes a first signal input from the first signal cable and outputs a resultant second signal to the second signal cable; a second multi-band signal processing device that processes a third signal input from the third signal cable and outputs a resultant fourth signal to the fourth signal cable; a first joint box that accommodates the first signal cable, the first multi-band signal processing device, the second signal cable, and the fourth signal cable; and a second joint box that
(Continued)

accommodates the second signal cable, the third signal cable, the second multi-band signal processing device, and the fourth signal cable.

19 Claims, 6 Drawing Sheets

(51) Int. Cl.
*G02B 6/28* (2006.01)
*H01S 3/067* (2006.01)
*H01S 3/23* (2006.01)
*G02B 6/293* (2006.01)

(52) U.S. Cl.
CPC ........ *H01S 3/06766* (2013.01); *H01S 3/2375* (2013.01); *H04B 10/294* (2013.01); *H04J 14/02* (2013.01); *G02B 6/293* (2013.01); *G02B 6/29391* (2013.01)

(58) Field of Classification Search
CPC .... H04B 10/291; H04B 10/29; H04B 10/035; H04B 10/2941; H04B 10/077; H01S 3/06766; H01S 3/0677; H01S 3/2375
USPC .......................................................... 398/34
See application file for complete search history.

(56) References Cited

U.S. PATENT DOCUMENTS

| | | | | |
|---|---|---|---|---|
| 6,384,943 B2* | 5/2002 | Ishikawa | ............ | G02B 6/29377 398/158 |
| 6,611,426 B2* | 8/2003 | Hutchison | ............ | H05K 7/1424 361/690 |
| 6,882,466 B1 | 4/2005 | Shimojoh et al. | | |
| 7,590,350 B2* | 9/2009 | Moffatt | ............... | H04J 14/0227 398/25 |
| 9,184,849 B2 | 11/2015 | Huang | | |
| 10,096,983 B2* | 10/2018 | Kummer | ................ | H02G 3/086 |
| 2001/0016100 A1 | 8/2001 | Sakuyama | | |
| 2002/0024690 A1 | 2/2002 | Iwaki et al. | | |
| 2002/0197893 A1* | 12/2002 | Hiroyuki | ................ | H05K 7/026 439/76.2 |
| 2004/0004756 A1* | 1/2004 | Hainberger | ......... | H01S 3/06758 359/341.3 |
| 2005/0041600 A1* | 2/2005 | Moffatt | ................. | H04J 14/025 370/254 |
| 2005/0163254 A1* | 7/2005 | Suzuki | .................. | H03F 1/3223 375/297 |
| 2006/0087723 A1 | 4/2006 | Takeyama et al. | | |
| 2009/0028566 A1 | 1/2009 | Abbott | | |
| 2017/0214484 A1* | 7/2017 | Zhang | .................. | H04B 10/294 |
| 2018/0132016 A1* | 5/2018 | Kamalov | ........... | H04B 10/2513 |

FOREIGN PATENT DOCUMENTS

| | | |
|---|---|---|
| EP | 1091509 A2 | 4/2001 |
| JP | H09-096843 A | 4/1997 |
| JP | H10-303861 A | 11/1998 |
| JP | 2001-102666 A | 4/2001 |

OTHER PUBLICATIONS

Chinese Office Action for CN Application No. 201780013074.0 dated Jul. 3, 2020 with English Translation.
International Search Report for PCT Application No. PCT/JP2017/006069, dated May 9, 2017.
English translation of Written opinion for PCT Application No. PCT/JP2017/006069.
Chinese Office Action for CN Application No. 201780013074.0 dated Jan. 4, 2021 with English Translation.

* cited by examiner

MULTI-BAND SIGNAL PROCESSING SYSTEM, JOINT BOX FOR MULTI-BAND SIGNAL PROCESSING SYSTEM, AND METHOD FOR ACCOMMODATING MULTI-BAND SIGNAL PROCESSING SYSTEM

This application is a National Stage Entry of PCT/JP2017/006069 filed on Feb. 20, 2017, which claims priority from Japanese Patent Application 2016-033048 filed on Feb. 24, 2016, the contents of all of which are incorporated herein by reference, in their entirety.

TECHNICAL FIELD

The present invention relates to a multi-band signal processing system including a plurality of single-band signal processing devices for processing multi-band signals, a joint box for the multi-band signal processing system, and a method for accommodating the multi-band signal processing system.

BACKGROUND ART

The bands (wavelength bands) used for optical communications include single-bands such as O band (Original-band: 1260 to 1360 nm), E band (Extended-band: 1360 to 1460 nm), S band (Short-band: 1460 to 1530 nm), C band (Conventional-band: 1530 to 1565 nm), and L band (Long-band: 1565 to 1625 nm). A multi-band consisting of C band and L band is referred to as "C+L band". Optical communications using the C+L band is used for a next-generation optical submarine system.

In current optical submarine systems, C band optical signals are used. There, for equalizer devices (hereafter, referred to as "EQL devices") used for gain equalization, only EQL devices for C band are used. In an optical submarine system, EQL devices are accommodated in a joint box (hereafter, referred to as a "JB") such as a factory joint (hereafter, referred to as an "FBJ") and a universal joint (hereafter, referred to as a "UJ"). Usually, one JB accommodates up to 16 single-band signal processing devices. In an optical submarine system using only C band optical signals, one single-band signal processing device (EQL device) is necessary for each optical fiber and, accordingly, one JB stores up to 16 optical fibers.

One example of technology of optical repeater transmission using a plurality of bands is disclosed in Patent Literature 1 (PTL 1). An optical repeater transmission device of PTL 1 performs optical repeater transmission in a multi-stage manner, by adopting optical fiber amplifiers each provided with an amplification fiber on the way of an optical fiber transmission line. The optical fiber amplifiers each have a characteristic in which the amplification factor increases or decreases monotonously with wavelength between two different wavelengths in the used band. In the optical repeater transmission device of PTL 1, a spectrum inverter is disposed in the halfway of the optical fiber transmission line and, accordingly, the amplification factor of each signal light component is made to be different between the first half and the latter half of the repeater transmission. As a result of that operation, the optical fiber amplifiers level the gains for different wavelengths, in the optical repeater transmission device of PTL 1.

However, in the optical repeater transmission device of PTL 1, the optical fiber amplifiers each have the particular characteristic in which the amplification factor increases or decreases monotonously with wavelength between two different wavelengths in the used band. Further, the optical repeater transmission device of PTL 1 requires the spectrum inverter. Accordingly, the optical repeater transmission device of PTL 1 has a problem of high implementation cost.

Thus, hereinafter, a description will be given of an example of technology of performing optical repeater transmission using a plurality of bands where general devices such as those of optical fiber amplifiers are used.

FIG. 6 is a block diagram showing an example of a configuration of a C+L band EQL system 900 which performs gain equalization of C+L band optical signals. Here, signals in FIG. 6 are each schematically represented by signal intensity levels of respective wavelengths.

The C+L band EQL system 900 receives an optical signal 891 of the C+L band, and outputs a gain-equalized optical signal 896. The C+L band EQL system 900 includes a C/L coupler 910, a C/L coupler 920, a C band EQL device 930 and an L band EQL device 940. The C+L band EQL system 900 is accommodated in a JB (not illustrated).

The C/L coupler 910 separates a C+L band optical signal 891 input to it and accordingly outputs a C band optical signal 892 and an L band optical signal 893.

The C band EQL device 930 outputs an optical signal 894 which is obtained by equalizing the C band optical signal 892 input to it.

The L band EQL device 940 outputs an optical signal 895 which is obtained by equalizing the L band optical signal 893 input to it.

The C/L coupler 920 combines together the equalized C band optical signal 894 and L band optical signal 895 input to it and accordingly outputs a C+L band optical signal 896.

CITATION LIST

Patent Literature

[PTL 1] Japanese Laid-Open Patent Application No. H09-96843

SUMMARY OF INVENTION

Technical Problem

The C+L band EQL system 900 includes, for each optical fiber, four single-band signal processing devices (the C/L coupler 910, the C/L coupler 920, the C band EQL device 930 and the L band EQL device 940). Because the maximum number of single-band signal processing devices accommodated in one JB is 16, the number of optical fibers accommodated in one JB is at most 4. Accordingly, the C+L band EQL system 900 has a problem in that the number of optical fibers it can accommodate is at most only a quarter of the maximum number of optical fibers accommodated in an optical submarine system using only C band. On the other hand, in an optical submarine system using optical signals of only C band, one JB accommodates up to 16 optical fibers, as described earlier. That is, in the C+L band EQL system 900, in order to accommodate the same number (16) of optical fibers as that accommodated in the optical submarine system using optical signals of only C band, four JBs need to be arranged in parallel. Accordingly, in the C+L band EQL system 900, of the four JBs necessary to accommodate 16 optical fibers, a cross sectional area perpendicular to an optical cable becomes four times as large as that of one JB in the optical submarine system using optical signals of only C band.

Objective of Invention

A primary objective of the present invention is to provide a multi-band signal processing system, a joint box for multi-band signal processing system, and a method for accommodating multi-band signal processing system, which can densely accommodate single-band signal processing devices.

Solution to Problem

A multi-band signal processing system of the present invention is characterized by including: a first signal cable, a second signal cable, a third signal cable and a fourth signal cable; a first multi-band signal processing device configured to output a second signal obtained by processing a first signal received from the first signal cable, to the second signal cable; a second multi-band signal processing device configured to output a fourth signal obtained by processing a third signal received from the third signal cable, to the fourth signal cable; a first joint box configured to accommodate the first signal cable, the first multi-band signal processing device, the second signal cable and the fourth signal cable; and a second joint box configured to accommodate the second signal cable, the third signal cable, the second multi-band signal processing device and the fourth signal cable.

A joint box for multi-band signal processing system of the present invention is characterized by including: a first joint box configured to accommodate a first signal cable, a first multi-band signal processing device configured to output to a second signal cable a second signal obtained by processing a first signal received from the first signal cable, the second signal cable, and a third signal cable; and a second joint box configured to accommodate the second signal cable, the third signal cable, a second multi-band signal processing device configured to output to a fourth signal cable a fourth signal obtained by processing a third signal received from the third signal cable, and the fourth signal cable.

A method for accommodating a multi-band signal processing system of the present invention is characterized by: accommodating, in a first joint box, a first signal cable, a first multi-band signal processing device configured to output to a second signal cable a second signal obtained by processing a first signal received from the first signal cable, the second signal cable, and a third signal cable; and accommodating, in a second joint box, the second signal cable, the third signal cable, a second multi-band signal processing device configured to output to a fourth signal cable a fourth signal obtained by processing a third signal received from the third signal cable, and the fourth signal cable.

Advantageous Effects of Invention

The present invention brings about an effect of making it possible to densely accommodate single-band signal processing devices.

EXAMPLE EMBODIMENT

Hereinafter, example embodiments of the present invention will be described in detail, with reference to drawings. In all of the drawings, identical signs will be assigned to equivalent constituent elements, and their descriptions will be omitted appropriately.

First Example Embodiment

A configuration of a first example embodiment of the present invention will be described below.

Figure 1:
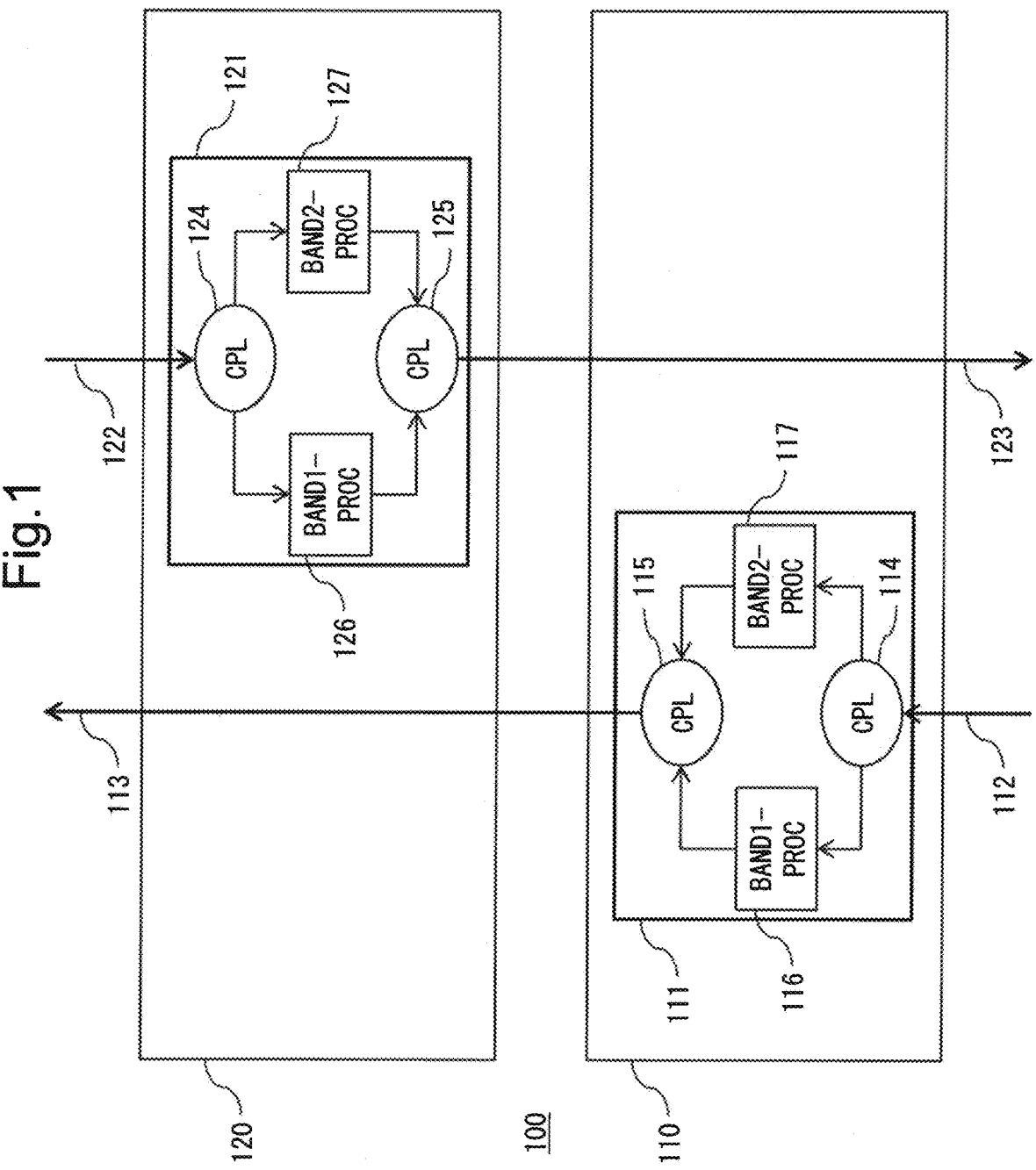
FIG. 1 is a block diagram showing an example of a configuration of a multi-band signal processing system according to a first example embodiment of the present invention.

FIG. 1 is a block diagram showing an example of a configuration of a multi-band signal processing system 100 according to the first example embodiment.

The multi-band signal processing system 100 includes signal cables 112, 113, 122 and 123, multi-band signal processing devices 111 and 121, and joint boxes 110 and 120.

The multi-band signal processing device 111 outputs an output signal obtained by processing an input signal received from the signal cable 112, to the signal cable 113.

The multi-band signal processing device 121 outputs an output signal obtained by processing an input signal received from the signal cable 122, to the signal cable 123.

The joint box 110 accommodates the signal cable 112, the multi-band signal processing device 111, the signal cable 113 and the signal cable 123. The joint box 110 accommodates up to four single-band signal processing devices or couplers and up to four signal cables.

The joint box 120 accommodates the signal cable 113, the signal cable 122, the multi-band signal processing device 121 and the signal cable 123. The joint box 120 accommodates up to four single-band signal processing devices or couplers and up to four signal cables.

The multi-band signal processing device 111 includes an input-side coupler 114, a single-band signal processing device 116, a single-band signal processing device 117 and an output-side coupler 115.

The input-side coupler 114 separates an input signal into a first band component and a second band component.

The single-band signal processing device 116 outputs a third band component which is obtained by equalizing the first band component.

The single-band signal processing device 117 outputs a fourth band component which is obtained by equalizing the second band component.

The output-side coupler 115 outputs an output signal which is obtained by combining together the third band component and the fourth band component.

The multi-band signal processing device 121 includes an input-side coupler 124, a single-band signal processing device 126, a single-band signal processing device 127 and an output-side coupler 125.

The Input-side coupler 124 separates an input signal into a first band component and a second band component.

The single-band signal processing device 126 outputs a third band component which is obtained by equalizing the first band component.

The single-band signal processing device 127 outputs a fourth band component which is obtained by equalizing the second band component.

The output-side coupler 125 outputs an output signal which is obtained by combining together the third band component and the fourth band component.

Operation of the present example embodiment will be described below.

In a single-band signal processing system, each signal cable is coupled to one single-band signal processing device, and not required to be coupled to any coupler. Accordingly, in such a single-band signal processing system, a joint box 110 accommodates up to four single-band signal processing devices and up to four signal cables.

On the other hand, in a general multi-band signal processing system, each signal cable is coupled to two single-band signal processing devices and two couplers. Accordingly, in such a multi-band signal processing system, a joint box 110 can accommodate at most only one signal cable which is coupled to four single-band signal processing devices.

However, in the multi-band signal processing system 100 of the present example embodiment, each of the two joint boxes 110 and 120 can accommodate up to two signal cables each coupled to two single-band signal processing devices and to two couplers.

As described above, in the multi-band signal processing system 100 of the present example embodiment, the joint box 110 accommodates the multi-band signal processing device 111 and the one signal cable 123 in a pass-through state. Similarly, the joint box 120 accommodates the multi-band signal processing device 121 and the one signal cable 113 in a pass-through state. Accordingly, two optical fibers and necessary single-band signal processing devices are accommodated within a width of the joint boxes 110 and 120 which are arranged in tandem with each other (within a cross-sectional area of the joint boxes in a plane perpendicular to the signal cables). Here, because the two joint boxes each accommodate a pass-through cable, they can be coupled in tandem with each other. Accordingly, within a cross-sectional area of only one joint box in a plane perpendicular to the signal cables, the two joint boxes can accommodate twice as many single-band signal processing devices as those which can be accommodated in one joint box. As a result, the multi-band signal processing system 100 of the present example embodiment has an effect of making it possible to densely accommodate single-band signal processing devices.

Second Example Embodiment

Next, a description will be given of a second example embodiment of the present invention, which is based on the multi-band signal processing system 100 of the first example embodiment of the present invention. A multi-band signal processing system of the present example embodiment is a C+L band EQL system.

A configuration of the present example embodiment will be described below.

Figure 2:
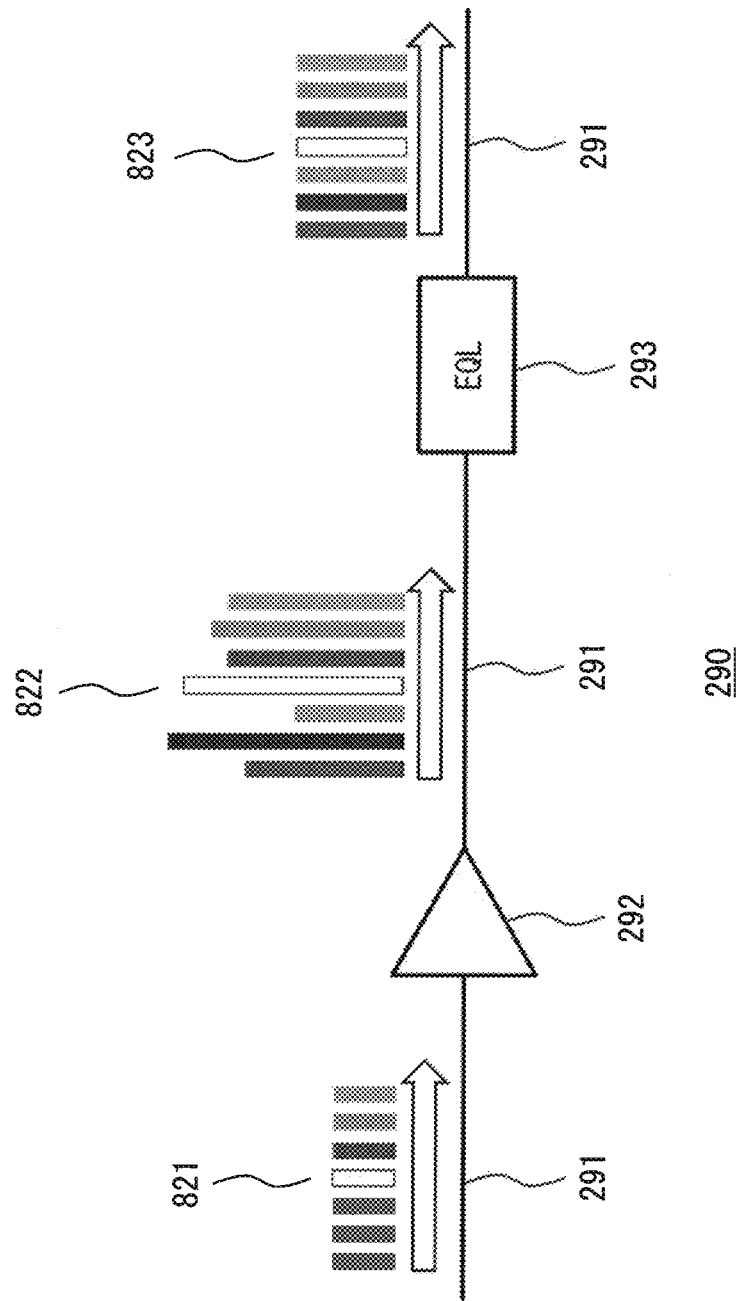
FIG. 2 is a block diagram showing an example of a configuration of a C+L band EQL system according to a second example embodiment of the present invention.

FIG. 2 is a block diagram showing an example of a configuration of a C+L band EQL system 200 according to the second example embodiment of the present invention.

Specifically, FIG. 2 shows a single-band signal processing path 290 included in the C+L band EQL system 200. Here, signals in FIG. 2 are each schematically represented by signal intensity levels of respective wavelengths.

The single-band signal processing path 290 includes optical fibers 291, a repeater 292 and a single-band EQL device 293.

The optical fibers 291 make optical coupling of input/output of the repeater 292 and of the single-band EQL device 293.

The repeater 292 outputs an optical signal 822 which is obtained by amplifying an optical signal 821. Here, for example, the repeater 292 is an EDF (Erbium Doped Fiber). Because an optical signal amplification factor of the repeater 292 such as an EDF differs with wavelength, signal intensity of the output optical signal 822 is different for each wavelength. In general, the repeater 292 is used in a multi-stage manner. Here, the repeater 292 is required only to be arranged at a stage prior to the single-band EQL device 293 on the optical fibers 291, but is not required to be arranged close to the single-band EQL device 293. Accordingly, the repeater 292 will be appropriately omitted in the following description of the single-band signal processing path 290.

The single-band EQL device 293 receives the optical signal 822 from the repeater 292 and outputs the optical signal 823 having been equalized, thereby leveling the output optical signal's spectrum.

Figure 3:
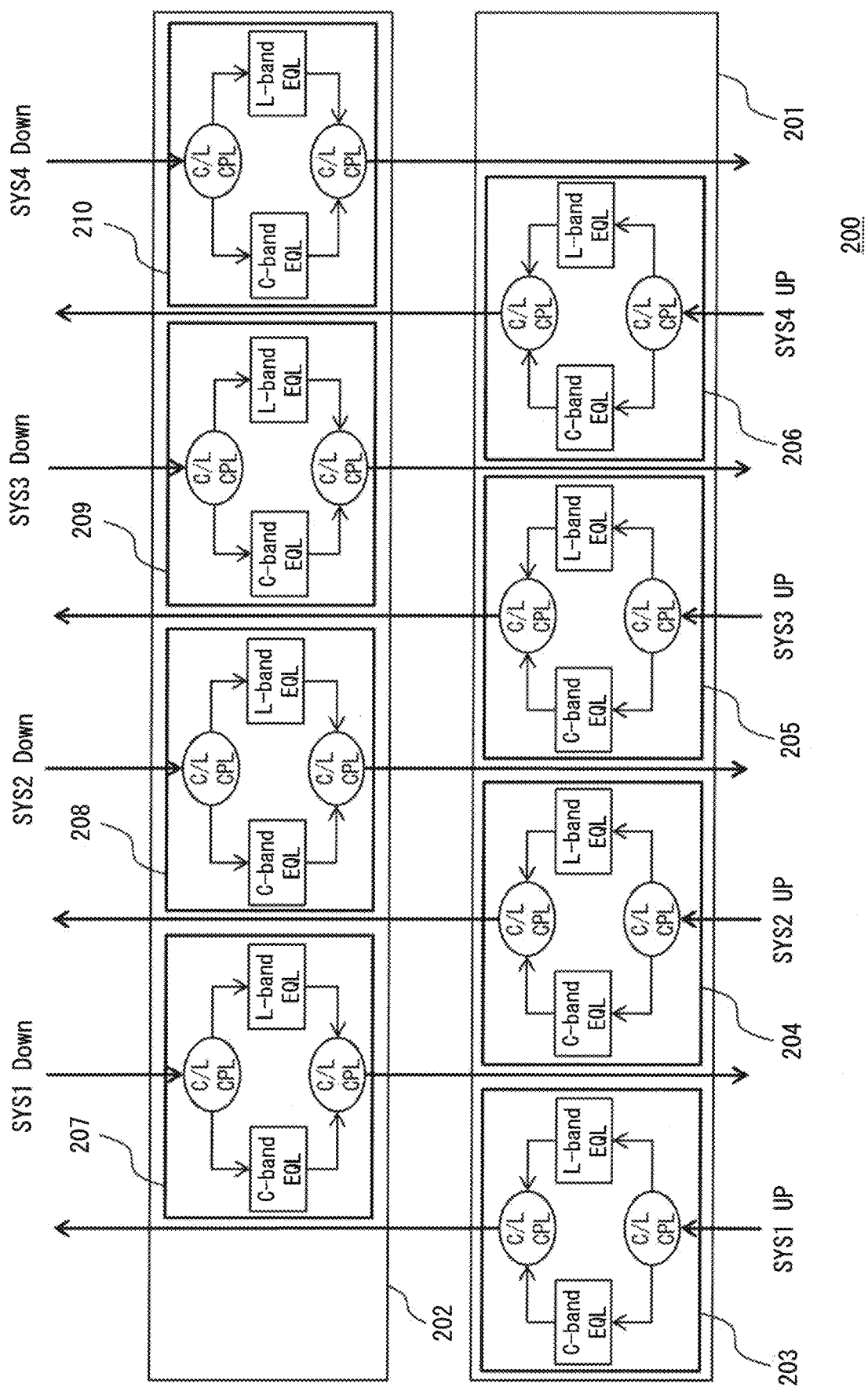
FIG. 3 is a block diagram showing an example of a configuration of a C+L band EQL system according to the second example embodiment of the present invention.

FIG. 3 is a block diagram showing an example of a configuration of the C+L band EQL system 200 according to the second example embodiment of the present invention. Specifically, FIG. 3 shows an example of the C+L band EQL system 200 which includes eight optical fibers and is accommodated in two JBs.

The C+L band EQL system 200 includes C+L band EQL devices 203, 204, 205 and 206 which are on upstream (UP) paths, C+L band EQL devices 207, 208, 209 and 210 which are on downstream (Down) paths, a JB 201 for the UP paths and a JB 202 for the Down paths.

Each of the C+L band EQL devices receives a C+L band optical signal and outputs an optical signal obtained by gain-equalizing the received optical signal. Each of the C+L band EQL devices includes an input-side C/L coupler, an output-side C/L coupler, a C band EQL device and an L band EQL device. The C+L band EQL devices are accommodated in the JB 201 and the JB 202.

The input-side C/L coupler separates a received C+L band optical signal and accordingly outputs a C band optical signal and an L band optical signal.

The C band EQL device receives the C band optical signal and outputs an optical signal obtained by equalizing the C band optical signal.

The L band EQL device receives the L band optical signal and outputs an optical signal obtained by equalizing the L band optical signal.

The output-side C/L coupler receives the equalized C band optical signal and L band optical signal, combines the received optical signals together, and outputs the combined optical signal as a C+L band optical signal.

A signal processing path including the input-side C/L coupler, either one of the C band EQL device and the L band EQL device, and the output-side C/L coupler is equivalent to the single-band signal processing path 290 described earlier.

The JB 201 can accommodate a plurality of "single-band EQL devices" and a plurality of optical fibers coupled to the single-band EQL devices. Here, the "single-band EQL devices" is a generic term used to refer to devices to be accommodated in a JB, such as the input-side C/L coupler, the output-side C/L coupler, the C band EQL device and the L band EQL device. The JB 201 can accommodate also optical fibers which are not coupled to any of the single-band EQL devices, in a pass-through manner. Here, the JB 201 may include a fitting unit which enables stack-coupling with one or more other JBs. Thus stack-coupled JBs become physically integrated together. The JB 201 is, for example, an FBJ, a UJ and the like. For example, the JB 201 can accommodate up to 16 single-band EQL devices. The JB 201 can accommodate also up to eight optical fibers.

The JB 202 has the same configuration as that of the JB 201.

Operation of the present example embodiment will be described below.

The JB 201 accommodates C+L band EQL devices 203, 204, 205 and 206 for upstream optical signals and four pass-through optical fibers for downstream optical signals.

The JB 202 accommodates C+L band EQL devices 207, 208, 209 and 210 for downstream optical signals and four pass-through optical fibers for upstream optical signals.

That is, by using the two JBs, the C+L band EQL system 200 accommodates eight optical fibers.

Here, the JB 201 and the JB 202 may each include a fitting unit which enables stack-coupling between them, and may thereby be integrated together physically.

As described above, in the C+L band EQL system 200 of the present example embodiment, the JB 201 accommodates the C+L band EQL devices 203, 204, 205 and 206 for upstream optical signals and four pass-through optical fibers for downstream optical signals. The JB 202 accommodates the C+L band EQL devices 207, 208, 209 and 210 for downstream optical signals and four pass-through optical fibers for upstream optical signals. Accordingly, within a width of the JB 201 and JB 201 arranged in tandem with each other (a cross-sectional area of the joint boxes in a plane perpendicular to the optical fibers), eight optical fibers and necessary single-band EQL devices are accommodated. Because the two joint boxes accommodate the respective pass-through optical fibers, they can be coupled in tandem with each other. Accordingly, within a cross-sectional area of one joint box in a plane perpendicular to the optical fibers, the two joint boxes can accommodate twice as many single-band signal processing devices as those which can be accommodated in one joint box. As a result, the C+L band EQL system 200 of the present example embodiment has an effect of making it possible to accommodate single-band signal processing devices densely.

While the above description has been given of an example in which the C+L band EQL system 200 includes eight optical fibers and is accommodated in two JBs, a C+L band EQL system of the present example embodiment is not limited to that one. A C+L band EQL system of the present example embodiment may be accommodated in three or more JBs, and may include any number of optical fibers equal to or more than two. When N-number of joint boxes (N: natural number equal to or more than two) are coupled in tandem with each other, the N-number of joint boxes can accommodate N-times as many signal processing devices as those which can be accommodated in one joint box, even within a cross-sectional area of one joint box in a plane perpendicular to the optical fibers. Further, in a C+L band EQL system of the present example embodiment, each JB may accommodate single-band EQL devices for upstream and that for downstream in a mixed manner, and each optical fiber may be coupled to any number of single-band EQL devices equal to or more than two.

Third Example Embodiment

Next, a description will be given of a C+L band EQL system according to a third example embodiment of the present invention, which is based on the above-described C+L band EQL system 200 of the second example embodiment of the present invention. In the C+L band EQL system of the present example embodiment, the C+L band EQL system 200 of the second example embodiment is modified such that a pair of a single-band EQL device for upstream and that for downstream is accommodated in the same JB.

A configuration of the present example embodiment will be described below.

Figure 4:
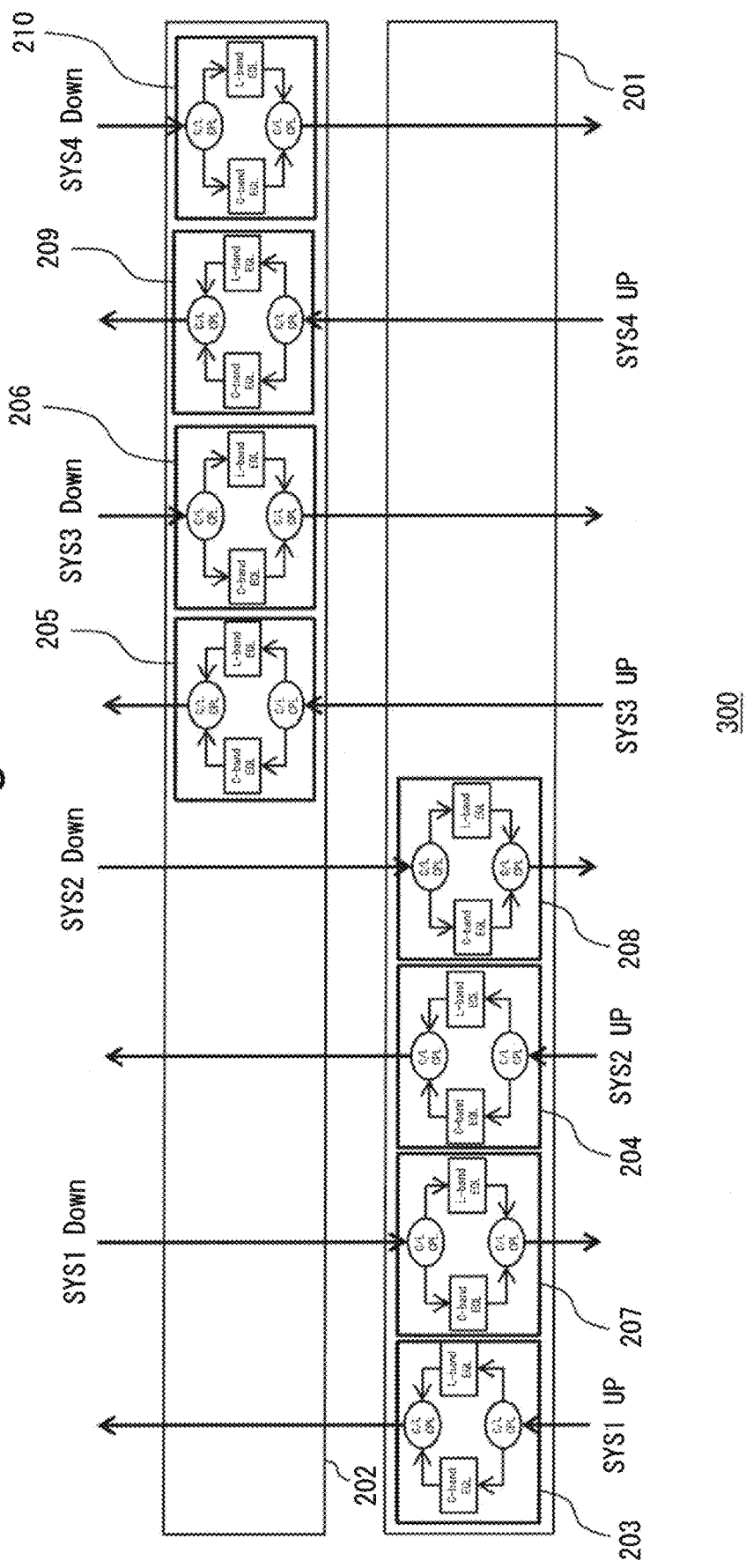
FIG. 4 is a block diagram showing an example of a configuration of a C+L band EQL system according to a third example embodiment of the present invention.

FIG. 4 is a block diagram showing an example of a configuration of a C+L band EQL system 300 according to the third example embodiment of the present invention.

C+L band EQL devices associated with a pair of an upstream optical fiber and a downstream optical fiber (FP: Fiber Pair) are accommodated in the same JB (either one of the JB 201 or the JB 202).

Specifically, the JB 201 accommodates, for SYS1 and SYS2, C+L band EQL devices for upstream 203 and 204 and C+L band EQL devices for downstream 207 and 208, and also accommodates, for SYS3 and SYS4, four pass-through optical fibers for upstream and downstream. The JB 202 accommodates, for SYS3 and SYS4, C+L band EQL devices for upstream 205 and 209 and C+L band EQL devices for downstream 206 and 210, and also accommodates, for SYS1 and SYS2, four pass-through optical fibers for upstream and downstream.

The rest of the configuration of the present example embodiment is the same as that of the second example embodiment.

As described above, in the C+L band EQL system 300 of the present example embodiment, for each FP, C+L band EQL devices associated the FP are accommodated in the same JB. Accordingly, on C+L band EQL devices associated with the same FP, a user can easily perform characteristics measurement and setting change. As a result, in addition to the effect of the C+L band EQL system 200 of the second example embodiment, the C+L band EQL system 300 of the present example embodiment has an effect of making it easy to change a gain equalization design of C+L band EQL devices in terms of each FP.

Further, in the C+L band EQL system 300 of the present example embodiment, because C+L band EQL devices associated with each FP are accommodated in the same JB, when adding C+L band EQL devices associated with a new FP, it is only necessary to perform operation for the addition only on a JB which is to include the new FP. As a result, the C+L band EQL system 300 of the present example embodiment has an effect of making the maintenance easier than the C+L band EQL system 200 of the second example embodiment.

Fourth Example Embodiment

Next, a description will be given of a C+L band EQL system according to a fourth example embodiment of the present invention, which is based on the above-described C+L band EQL system 200 of the second example embodiment of the present invention. In the C+L band EQL system of the present example embodiment, the C+L band EQL system 200 of the second example embodiment is modified such that the two JBs 201 and 202 each capable of accommodating eight optical fibers are replaced by four JBs each capable of accommodating 16 optical fibers.

A configuration of the present example embodiment will be described below.

Figure 5:
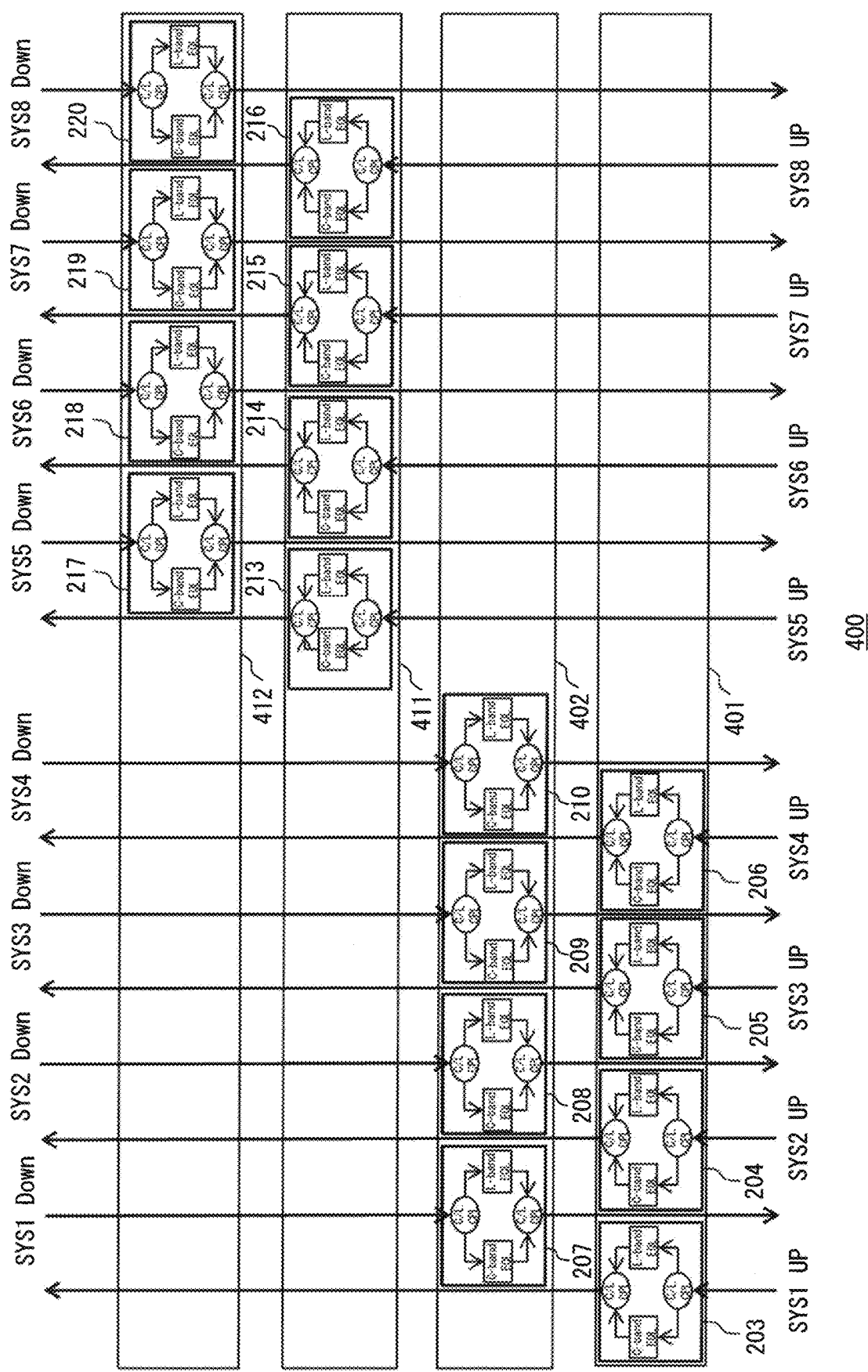
FIG. 5 is a block diagram showing an example of a configuration of a C+L band EQL system according to a fourth example embodiment of the present invention.
Figure 6:
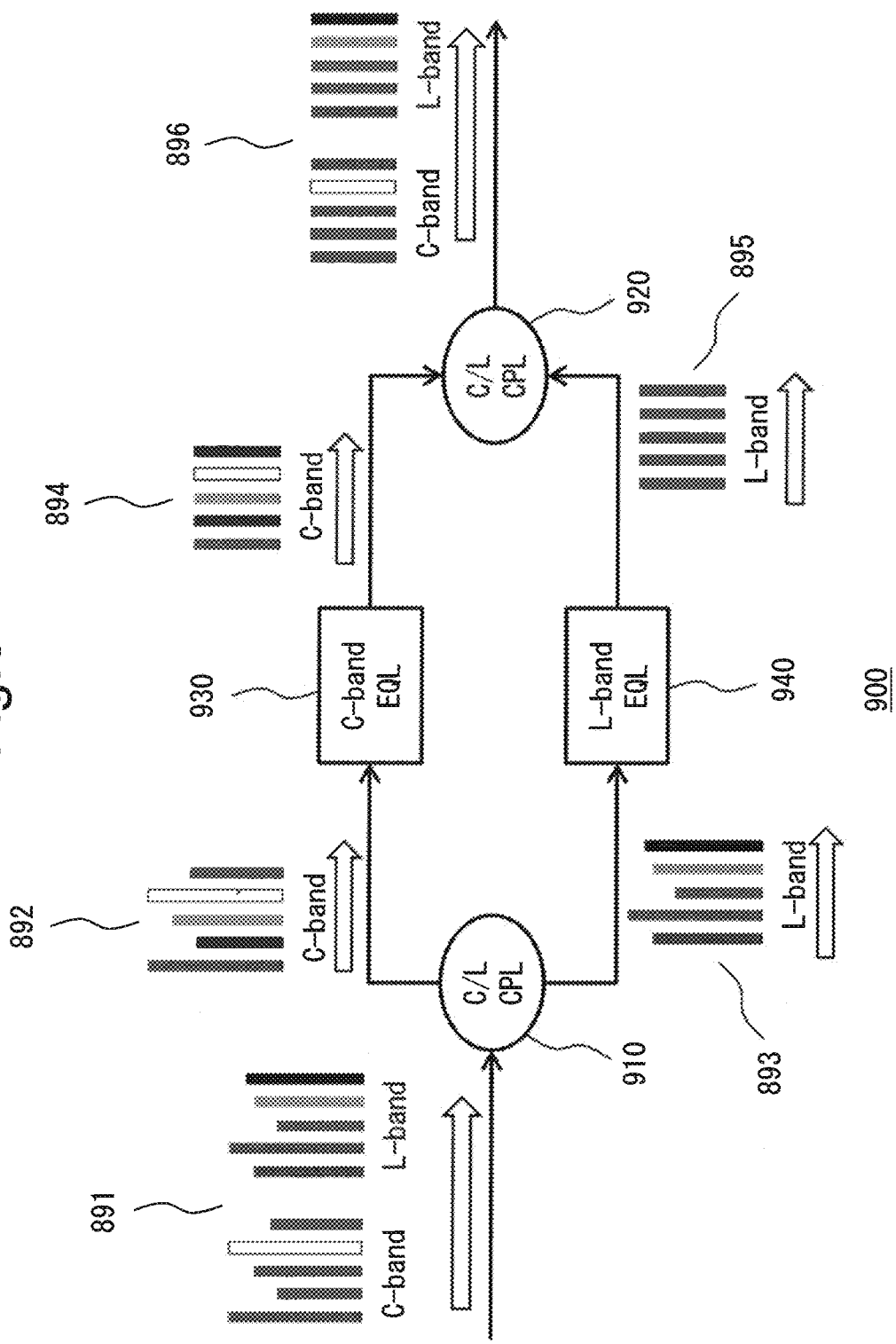
FIG. 6 is a block diagram showing an example of a configuration of a C+L band EQL system performing gain equalization of C+L band optical signals.

FIG. 5 is a block diagram showing an example of a configuration of a C+L band EQL system 400 according to the fourth example embodiment of the present invention.

The C+L band EQL system 400 includes JBs 401, 402, 411 and 412, in place of the JBs 201 and 202 in the C+L band EQL system 200 of the second example embodiment. The JBs 401, 402, 411 and 412 can each accommodate up to 16 optical fibers.

In the C+L band EQL system 400, in addition to the constituent elements of the C+L band EQL system 200 of the second example embodiment, C+L band EQL devices 213, 214, 215, 216, 217, 218, 219 and 220 and eight additional optical fibers are included.

The rest of the configuration of the present example embodiment is the same as that of the second example embodiment.

Operation of the present example embodiment will be described below.

The JB 401 accommodates C+L band EQL devices 203, 204, 205 and 206 for upstream optical signals of SYS1 to SYS4, four pass-through optical fibers for downstream optical signals of SYS1 to SYS4, and eight pass-through optical fibers for upstream and downstream optical signals of SYS5 to SYS8.

The JB 402 accommodates C+L band EQL devices 207, 208, 209 and 210 for downstream optical signals of SYS1 to SYS4, four pass-through optical fibers for upstream optical signals of SYS1 to SYS4, and eight pass-through optical fibers for upstream and downstream optical signals of SYS5 to SYS8.

The JB 411 accommodates C+L band EQL devices 213, 214, 215 and 216 for upstream optical signals of SYS5 to SYS8, four pass-through optical fibers for downstream optical signals of SYS5 to SYS8, and eight pass-through optical fibers for upstream and downstream optical signals of SYS1 to SYS4.

The JB 412 accommodates C+L band EQL devices 217, 218, 219 and 220 for downstream optical signals of SYS5 to SYS8, four pass-through optical fibers for upstream optical signals of SYS5 to SYS8, and eight pass-through optical fibers for upstream and downstream optical signals of SYS1 to SYS4.

As described above, the C+L band EQL system 400 of the present example embodiment includes the four JBs, and each of the JBs accommodates one-fourth of all the C+L band EQL devices and all of the optical fibers. Accordingly, within a width of the JB 401, JB 402, JB 411 and JB 412 arranged in tandem with each other (a cross-sectional area of the joint boxes in a plane perpendicular to the optical fibers), 16 optical fibers and necessary single-band EQL devices are accommodated. Because the four joint boxes accommodate the respective pass-through optical fibers, they can be coupled in tandem with each other. Accordingly, within a cross-sectional area of one joint box in a plane perpendicular to the optical fibers, the four joint boxes can accommodate four times as many single-band signal processing devices as those which can be accommodated in one joint box. As a result, the C+L band EQL system 400 of the present example embodiment has an effect of making it possible to accommodate twice as many single-band signal processing devices as those which can be accommodated in the C+L band EQL system 200 of the second example embodiment.

By increasing the number of optical fibers able to be passed through by each JB and also increasing the number of JBs, the number of single-band signal processing devices and that of signal fibers included in the C+L band EQL system can be increased further.

As above, the present invention has been described exemplarily using the example embodiments and examples thereof described above. However, the technical scope of the present invention is not limited to the range described in the above-described example embodiments and examples thereof. It is obvious for those skilled in the art that a variety of changes or improvements can be made to the example embodiments. In such cases, any new example embodiments achieved by applying such changes or improvements are embraced within the technical scope of the present invention. That is obvious from matters described in claims.

INDUSTRIAL APPLICABILITY

The present invention is useful for increasing system extensibility of a device which is limited in the number of components it can accommodate.

The present invention has been described above, taking the above-described example embodiments as exemplary examples. However, the present invention is not limited to the above-described example embodiments. That is, to the present invention, various aspects which can be understood by those skilled in the art may be applied within the scope of the present invention.

This application is based upon and claims the benefit of priority from Japanese Patent Application No. 2016-033048 filed on Feb. 24, 2016, the disclosure of which is incorporated herein in its entirety by reference.

REFERENCE SIGNS LIST 100 multi-band signal processing system
110, 120 joint box
112, 113, 122, 123 signal cable
111, 121 multi-band signal processing device
114 input-side coupler
115 output-side coupler
116 single-band signal processing device
117 single-band signal processing device
124 input-side coupler
125 output-side coupler
126 single-band signal processing device
127 single-band signal processing device
200 C+L band EQL system
201, 202 JB
203, 204, 205, 206 C+L band EQL device
207, 208, 209, 210 C+L band EQL device
290 single-band signal processing path
291 optical fiber
292 repeater
293 single-band EQL device
300 C+L band EQL system
400 C+L band EQL system
401, 402, 411, 412 JB
213, 214, 215, 216 C+L band EQL device
217, 218, 219, 220 C+L band EQL device
821, 822, 823 optical signal
891, 892, 893, 894, 895, 896 optical signal
900 C+L band EQL system
910, 920 C/L coupler
930 C band EQL device

What is claimed is:

1. A multi-band signal processing system comprising:
a first signal cable;
a second signal cable;
a third signal cable;
a fourth signal cable;
a first multi-band signal processing device including a first coupler, a second coupler, a first single-band signal processing device, and a second single-band signal processing device;
a second multi-band signal processing device including a third coupler, a fourth coupler, a third single-band signal processing device, and a fourth single-band signal processing device;
a first joint box configured to accommodate the fourth signal cable in a pass-through state, the first signal cable, the second signal cable, and the first multi-band signal processing device; and
a second joint box configured to accommodate the second signal cable in a pass-through state, the third signal cable, the fourth signal cable, and the second multi-band signal processing device,
wherein:
the first signal cable and the second signal cable are configured to transmit a first optical signal,
the third signal cable and the fourth signal cable are configured to transmit a second optical signal,
the first multi-band signal processing device is configured to process the first optical signal, and
the second multi-band signal processing device is configured to process the second optical signal.

2. The multi-band signal processing system according to claim 1, wherein each of the first joint box and the second joint box are configured to be stack-coupled with the other one.

3. The multi-band signal processing system according to claim 1, wherein the first signal cable and the second signal cable are optical fibers.

4. The multi-band signal processing system according to claim 1, wherein each of the first optical signal and the second optical signal includes a C band optical signal and an L band optical signal.

5. The multi-band signal processing system according to claim 1,
wherein the first coupler is configured to separate the first optical signal into a first band signal and a second band component signal,
wherein the first single-band signal processing device is configured to equalize the first band signal,
wherein the second single-band signal processing device is configured to equalize the second band signal, and
wherein the second coupler is configured to combine together the equalized first band signal and the equalized second band signal.

6. A joint box for multi-band signal processing system, the joint box comprising:
a first joint box configured to accommodate a fourth signal cable in a pass-through state, a first signal cable, a second signal cable, and a first multi-band signal processing device including a first coupler, a second coupler, a first single-band signal processing device, and a second single-band signal processing device; and
a second joint box configured to accommodate the second signal cable in a pass-through state, a third signal cable, the fourth signal cable, and a second multi-band signal processing device including a third coupler, a fourth coupler, a third single-band signal processing device, and a fourth single-band signal processing device,
wherein:
the first signal cable and the second signal cable are configured to transmit a first optical signal,
the third signal cable and the fourth signal cable are configured to transmit a second optical signal,
the first multi-band signal processing device is configured to process the first optical signal, and
the second multi-band signal processing device is configured to process the second optical signal.

7. A method for accommodating multi-band signal processing system, the method comprising:
accommodating, in a first joint box, a fourth signal cable in a pass-through state, a first signal cable, a second signal cable, and a first multi-band signal processing device including a first coupler, a second coupler, a first single-band signal processing device, and a second single-band signal processing device; and
accommodating, in a second joint box, the second signal cable in a pass-through state, a third signal cable, the fourth signal cable, and a second multi-band signal processing device including a third coupler, a fourth coupler, a third single-band signal processing device, and a fourth single-band signal processing device,
wherein:
the first signal cable and the second signal cable are configured to transmit a first optical signal,
the third signal cable and the fourth signal cable are configured to transmit a second optical signal,
the first multi-band signal processing device is configured to process the first optical signal, and
the second multi-band signal processing device is configured to process the second optical signal.

8. The joint box for multi-band signal processing system according to claim 6, wherein each of the first joint box and the second joint box are configured to be stack-coupled with the other one.

9. The multi-band signal processing system according to claim 2, wherein the first signal cable and the second signal cable are optical fibers.

10. The multi-band signal processing system according to claim 2, wherein each of the first optical signal and the second optical signal includes a C band optical signal and an L band optical signal.

11. The multi-band signal processing system according to claim 3, wherein each of the first optical signal and the second optical signal includes a C band optical signal and an L band optical signal.

12. The multi-band signal processing system according to claim 9, wherein each of the first optical signal and the second optical signal includes a C band optical signal and an L band optical signal.

13. The multi-band signal processing system according to claim 2,
wherein the first coupler is configured to separate the first optical signal into a first band signal and a second band signal,
wherein the first single-band signal processing device is configured to equalize the first band signal,
wherein the second single-band signal processing device is configured to equalize the second band signal, and
wherein the second coupler is configured to combine together the equalized first band signal and the equalized second band signal.

14. The multi-band signal processing system according to claim 3, wherein the first coupler is configured to separate the first optical signal into a first band signal and a second band signal,
wherein the first single-band signal processing device is configured to equalize the first band signal,
wherein the second single-band signal processing device is configured to equalize the second band signal, and
wherein the second coupler is configured to combine together the equalized first band signal and the equalized second band signal.

15. The multi-band signal processing system according to claim 4,
wherein the first coupler is configured to separate the first optical signal into a first band signal and a second band signal,
wherein the first single-band signal processing device is configured to equalize the first band signal,
wherein the second single-band signal processing device is configured to equalize the second band signal, and
wherein the second coupler is configured to combine together the equalized first band signal and the equalized second band signal.

16. The multi-band signal processing system according to claim 9,
wherein the first coupler is configured to separate the first optical signal into a first band signal and a second band signal,
wherein the first single-band signal processing device is configured to equalize the first band signal,
wherein the second single-band signal processing device is configured to equalize the second band signal, and
wherein the second coupler is configured to combine together the equalized first band signal and the equalized second band signal.

17. The multi-band signal processing system according to claim 10,
wherein the first coupler is configured to separate the first optical signal into a first band signal and a second band signal,
wherein the first single-band signal processing device is configured to equalize the first band signal,
wherein the second single-band signal processing device is configured to equalize the second band signal, and
wherein the second coupler is configured to combine together the equalized first band signal and the equalized second band signal.

18. The multi-band signal processing system according to claim 11,
wherein the first coupler is configured to separate the first optical signal into a first band signal and a second band signal,
wherein the first single-band signal processing device is configured to equalize the first band signal,
wherein the second single-band signal processing device is configured to equalize the second band signal, and
wherein the second coupler is configured to combine together the equalized first band signal and the equalized second band signal.

19. The multi-band signal processing system according to claim 12,
wherein the first coupler is configured to separate the first optical signal into a first band signal and a second band signal,
wherein a first single-band signal processing device is configured to equalize the first band signal,
wherein the second single-band signal processing device is configured to equalize the second band signal, and
wherein the second coupler is configured to combine together the equalized first band signal and the equalized second band signal.

\* \* \* \* \*